United States Patent
Kim

(10) Patent No.: US 7,118,297 B2
(45) Date of Patent: Oct. 10, 2006

(54) PRINT OPTION SETTING METHOD AND SYSTEM FOR IMAGE FORMING DEVICES

(75) Inventor: Hyun-chul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/893,254

(22) Filed: Jul. 19, 2004

(65) Prior Publication Data

US 2005/0025548 A1 Feb. 3, 2005

(30) Foreign Application Priority Data

Jul. 29, 2003 (KR) ............... 10-2003-0052433

(51) Int. Cl.
*B41J 5/30* (2006.01)
*G06K 15/00* (2006.01)

(52) U.S. Cl. .................. 400/62; 400/61; 358/1.18

(58) Field of Classification Search ............ 400/62, 400/61; 358/1.18, 1.1, 1.14; 347/19
See application file for complete search history.

(56) References Cited

U.S. PATENT DOCUMENTS

| | | | | |
|---|---|---|---|---|
| 4,658,366 A | * | 4/1987 | Posh | 715/507 |
| 5,297,017 A | * | 3/1994 | Haselby et al. | 347/19 |
| 5,480,240 A | * | 1/1996 | Bolash et al. | 400/124.01 |
| 5,790,768 A | * | 8/1998 | Windel et al. | 358/1.18 |
| 5,835,820 A | * | 11/1998 | Martin et al. | 399/85 |
| 5,878,198 A | * | 3/1999 | Yuasa et al. | 358/1.18 |
| 6,154,230 A | * | 11/2000 | Holstun et al. | 347/19 |
| 6,203,220 B1 | * | 3/2001 | Takenoshita et al. | 400/61 |
| 6,353,481 B1 | * | 3/2002 | Lee | 358/1.14 |
| 6,644,873 B1 | * | 11/2003 | Kurashina | 400/61 |
| 6,707,571 B1 | * | 3/2004 | Kurashina | 358/1.18 |
| 6,771,391 B1 | * | 8/2004 | Konishi et al. | 358/1.9 |

FOREIGN PATENT DOCUMENTS

| | | |
|---|---|---|
| JP | 58114983 | 7/1983 |
| JP | 61160271 | 7/1986 |
| JP | 05-031998 | 9/1993 |
| KR | 1993002126 | 2/1993 |
| KR | 1999-0038520 | 6/1999 |

* cited by examiner

*Primary Examiner*—Daniel J. Colilla
*Assistant Examiner*—Wasseem H. Hamdan
(74) *Attorney, Agent, or Firm*—Roylance, Abrams, Berdo & Goodman, L.L.P.

(57) ABSTRACT

A method and system for setting print options for media to be printed in image-forming devices according to a specific form format is provided. The print option setting method and system includes the steps of detecting line feed information from a print file in the image-forming device, and extracting at least one or more lines included in the print file based on the line feed information; setting the number of characters to be printed per unit length for each of the extracted lines and the number of lines; and sending the information on the characters set line by line and the number of lines to the image-forming device.

14 Claims, 9 Drawing Sheets

FIG. 1
(PRIOR ART)

GIRO RECEIPT (FOR CUSTOMER)

| GIRO NUMBER | 5 | 2 | 7 | 3 | 8 | 2 | 8 |

| AMOUNT | 130,000 |

CARD NUMBER   231935309   NAME   JI, CHUNG-HEE

| DETAILS | AMOUNT |
|---|---|
| • PREVIOUS OUTSTANDING AMOUNT | 130000 |
| • AMOUNT DUE THIS MONTH | |
| • AMOUNT OVERPAID | |
| • AMOUNT DUE | 130000 |

DUE ON   JUNE 27, 2003

FIG. 3

| 0×1B | COMMAND | DATA | 0D0A |

(a)

(b)

(c)

PRINT OPTION SETTING METHOD AND SYSTEM FOR IMAGE FORMING DEVICES

CROSS-REFERENCE TO RELATED APPLICATION

This application claims priority under 35 U.S.C. § 119(a) to Korean Patent Application No. 2003-52433, filed on Jul. 29, 2003, in the Korean Intellectual Property Office, the entire disclosure of which is incorporated herein by reference.

BACKGROUND OF THE INVENTION

1. Field of the Invention

The present invention relates to a method and system for setting print options in image-forming devices. More particularly, the present invention relates to a method and system for setting print options for media to be printed in image-forming devices according to specific form formats.

2. Description of the Related Art

Typically, image-forming devices such as laser printers, inkjet printers, and facsimile machines print text or graphics on a medium such as paper, by applying pre-set character-per-inch (CPI) and line-per-inch (LPI) values. The CPI value and/or the LPI value can be set by a user for each page if necessary. The CPI indicates the number of characters to be printed per inch in the width direction of a medium such as paper, and the LPI indicates the number of text lines to be printed in the height direction of the medium. That is, if the CPI value is set larger, the number of characters to be printed per text line increases, and, if the LPI value is set larger, the number of text lines to be printed per page increases.

FIG. 1 is a diagram illustrating a conventional printer output of an exemplary receipt.

In the case of a receipt issued from institutions such as banks, the receipt size is usually standardized for banking transactions, and if lots of characters are printed in a limited space, the CPI value is generally set high. Since the image-forming device such as a printer has a function of re-setting the CPI value and the LPI value for every page, the numbers and characters entered on the shown receipt are printed in the same CPI and LPI values.

Accordingly, printing has to be performed in a smaller font for the details to be captured for an area 10 illustratively shown as "card number" in which many characters to be printed in a small area, and in a large font for characters in the area 11 illustratively shown as "231935309". As a result of using different font sizes, the text for area 11 does not look like it is on the same line as the characters in area 10.

Further, if a number is entered in the area 12, the entire format of the receipt is affected by the CPI value so that the number and lines may overlap as shown in the area A. Thus, in order to solve the above problem, users have to design the receipt format according to the available CPI and LPI values, which requires lots of time and effort. In addition, if a standard exists for the receipt size and format, it takes more time to solve the problem.

SUMMARY OF THE INVENTION

Accordingly, it is an aspect of the present invention to provide a print method and system capable of easily re-setting character-per-inch (CPI) and line-per-inch (LPI) values on a single page regardless of the kinds of formats for a form.

In order to achieve the above aspects, a print option setting method and system for image-forming devices according to an embodiment of the present invention comprises the steps of detecting line feed information from a print file in the image-forming device, and extracting at least one or more lines from the print file based on the line feed information; setting the number of characters to be printed per unit length for each of the extracted lines and the total number of lines; and transmitting the information on the characters set line by line and the number of lines to the image-forming device.

Preferably, the image-forming device stores the transmitted information on the number of characters to be printed per unit length and the number of lines by unit group.

It is preferable that the image-forming device has information on the number of characters per unit length for each of the lines and the number of lines, and the information being formed by at least one or more unit groups and provided in the print file.

In order to achieve the above aspects, a print option setting method for image-forming devices in which print options are set through an information processing system having a display unit, according to an embodiment of the present invention, comprises the steps of extracting at least one piece of line information from a print file using the information processing system; displaying individual lines on the display unit through predetermined Graphic User Interface(GUI) menus based on the extracted line information; setting the number of characters to be printed per unit length based on the lines and the number of lines displayed on the display unit; and transmitting the number of characters to be printed per unit length set line by line and the number of lines to the image-forming device.

Preferably, the GUI menus include a preview function for displaying on a portion of the display unit a result obtained from applying the number of characters to be printed per unit length and the number of lines that are set to the print file.

It is preferable that the step of setting the number of characters to be printed per unit length and the number of lines further includes a step of re-setting the number of characters to be printed per unit length and the number of lines.

Preferably, the GUI menus include a line display menu for displaying the extracted line feed information; a setting value entry menu provided on one side of the line display menu, and for entering the number of characters to be printed per unit length and the number of lines regarding the line display menu; and a menu for selecting and releasing values of the numbers entered in the setting value entry menu.

Preferably, the setting value entry menu includes a character setting menu for entering a value of the number of characters to be printed per unit length; and a line setting menu for entering a value of the number of lines to be printed per unit length.

Preferably, the GUI menu further includes a setting value transfer option for transmitting information on the set number of characters and lines to the image-forming device.

BRIEF DESCRIPTION OF THE DRAWINGS

The invention will be described in detail with reference to the following drawings in which like reference numerals refer to like elements, and wherein:

FIG. 1 is a diagram illustrating an exemplary conventional printed receipt;

FIG. 3 is diagram illustrating a structure of a print file applied to the image-forming device from the personal computer system shown in FIG. 2;

It should be understood that in the drawings, like reference numbers refer to like features and structures.

DETAILED DESCRIPTION OF THE PREFERRED EMBODIMENTS

Hereinafter, the present invention will be described in detail with reference to the accompanying drawings.

Figure 2:
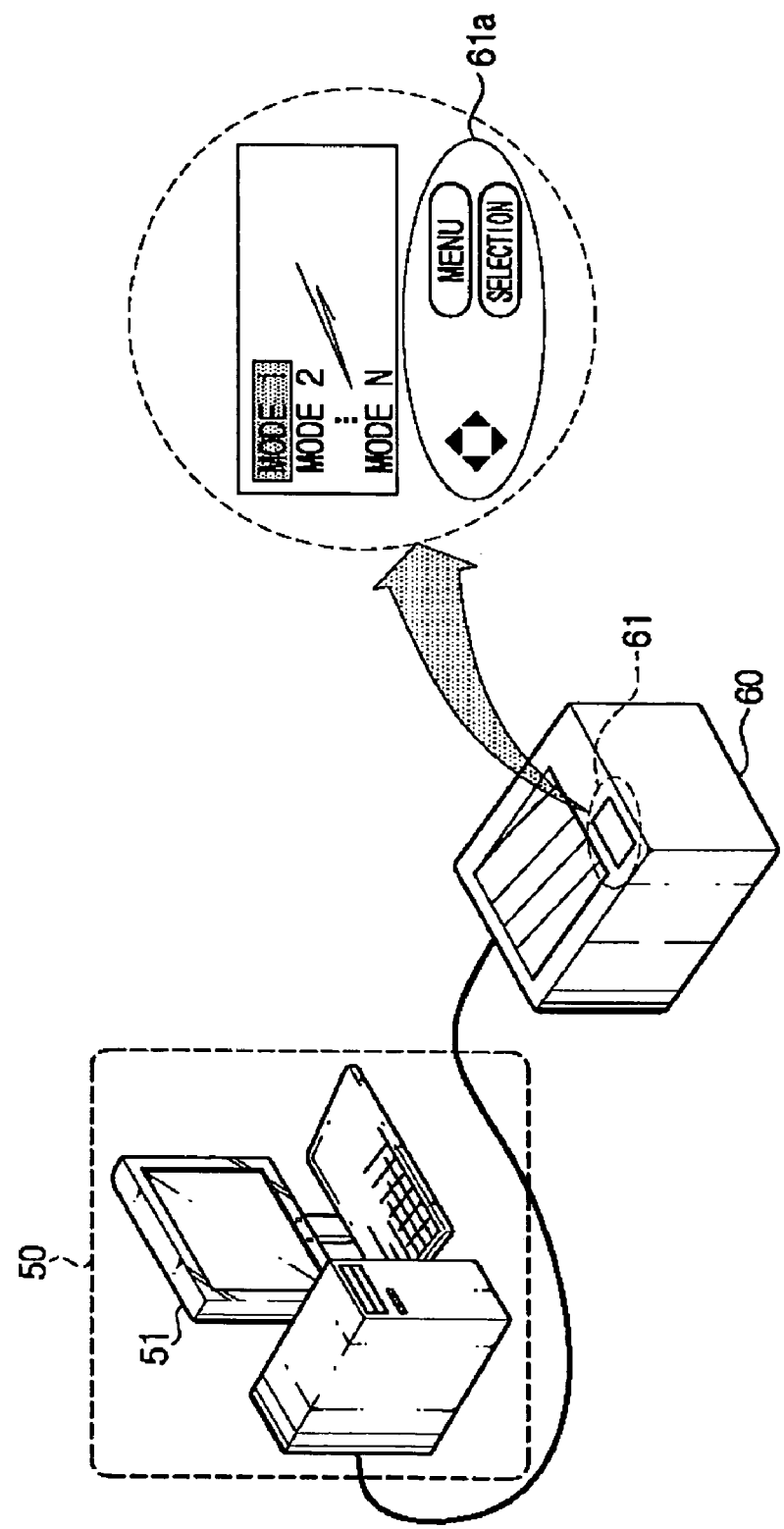
FIG. 2 is a diagram illustrating a personal computer and printer system according to an embodiment of the present invention.

FIG. 2 is a diagram illustrating a personal computer and printer system according to an embodiment of the present invention.

As shown in FIG. 2, a personal computer system 50 having a monitor 51 sets character-per-inch (CPI) and line-per-inch (LPI) values for lines comprising a file to be printed (hereinafter, referred to as a print file), and sends the set CPI and LPI values to an image-forming device 60, illustratively shown as a printer. For example, if a print file is determined to contain 10 lines, a user sets CPI and LPI values for each of the first to tenth lines using the computer system 50, and sends the set values to the image-forming device 60. The procedures are repeated, and CPI and LPI values corresponding to individual formats of the lines are stored by mode corresponding to each format. The procedures display a certain Graphic User Interface (GUI) window on the monitor 51, have a CPI value and an LPI value entered on the displayed GUI window, and verify an output through a preview function. Further, the procedures allow the personal computer 50 to have a CPI value and an LPI value based on mode corresponding to a print file having a variety of formats, so that a user can select the CPI and LPI values according to a desired format and apply the selected CPI and LPI values to a print task.

Thereafter, upon printing a print file, the image-forming device 60 selects a desired mode of modes mode1, mode2, and so on and mode set by group as to CPI and LPI values through a setting key 61a provided on the operation panel 61, and performs printing according to the CPI and LPI values set line by line.

The embodiments of the present invention include an application program for setting CPI and LPI values for each line in a Read Only Memory (ROM) such as flash ROM, Erasable Programmable Read Only Memory (EPROM), and so on which is provided in the image-forming device 60, in order to perform the setting of the CPI and LPI values for each line without using the personal computer system 50.

In this case, a user directly sets CPI and LPI values for individual lines forming a print file through the operation panel 61 provided on the image-forming device 60, and matches the CPI and LPI values with a certain mode such as model. However, when setting the CPI and LPI values using such a method, the user can not perform a preview function through the monitor 51 provided for the personal computer system 50, but directly performs test printing for a print file through the image-forming device 60.

Figure 3:
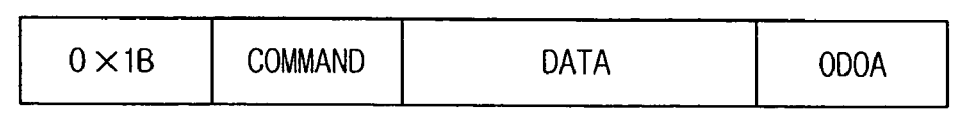

FIG. 3 is a diagram illustrating a structure of a print file applied to the image-forming device 60 from the personal computer system 50 shown in FIG. 2.

As shown in FIG. 3, a print file is applied to the image-forming device 60 sequentially for each line, and has a code 0X1B indicating the start of the file, a control code Command for a corresponding line, print data data, and a line feed (LF) information illustratively shown as 0D0A indicating the end of the line. The control code Command has a function for setting character sizes, character styles such as italic font, arial font, and so on, and print resolution, when a print file is printed.

Figure 4A:
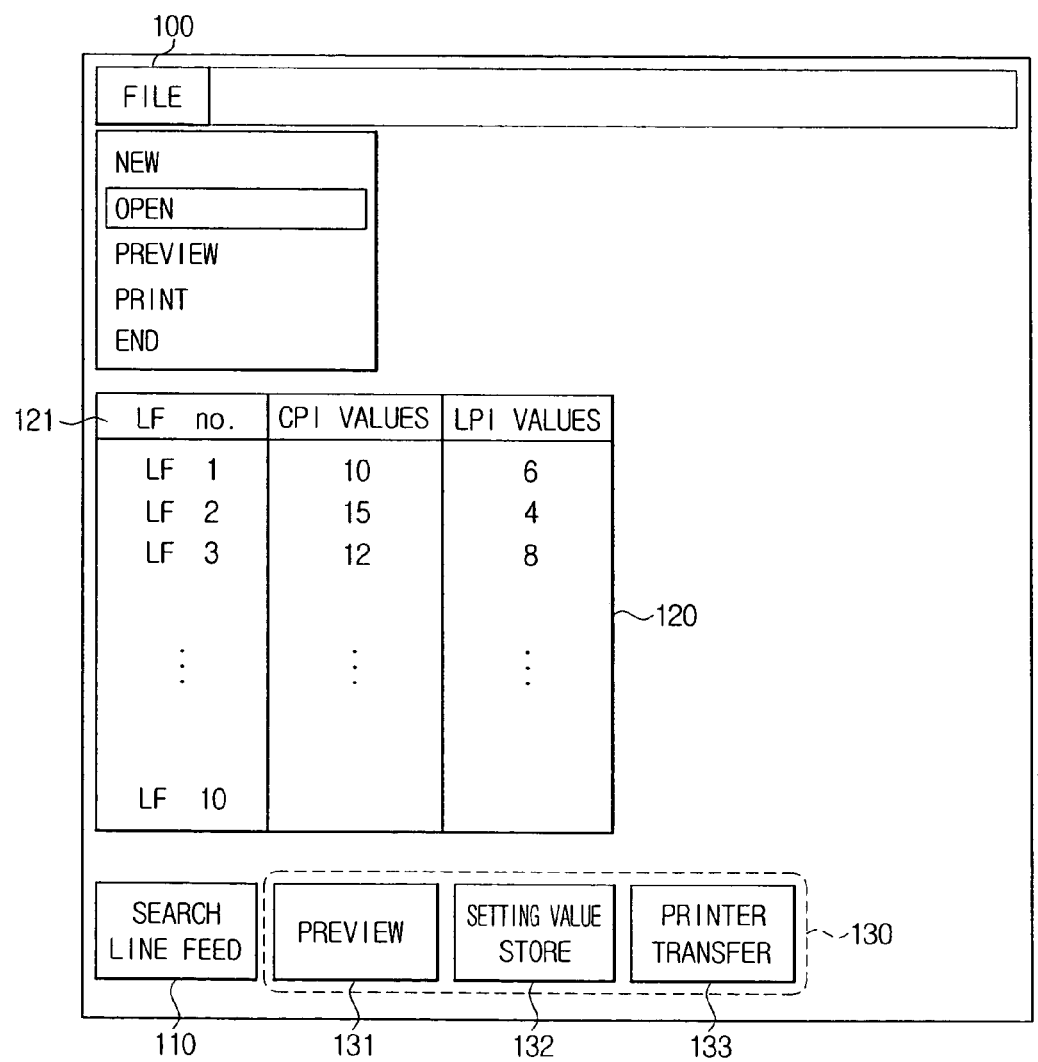
FIG. 4A is a diagram illustrating a Graphical User Interface (GUI) window displayed on a monitor of the personal computer system shown in FIG. 2.

FIG. 4A is a diagram illustrating GUI windows displayed in the monitor 51 shown in FIG. 2.

The shown GUI windows have a file menu 100, a "search line feed" menu 110, a "setting value entry" menu 120, and an "additional function" menu 130.

The file menu 100 has options for opening or printing desired print files for the print files stored in the personal computer system 50.

The "search line feed" menu 110 analyzes a print file opened through the file menu 100 and extracts a line feed signal LF provided in the print file. The extracted line feed signal LF is displayed on a "line display" menu 121 provided in the "setting value entry" menu 120 in detected order.

The "setting value entry" menu 120 can be provided with CPI values and LPI values referred to as numbers LF1, LF2, up to LF10 corresponding to respective line feed signals searched from the "search line feed" menu 110. A user enters the CPI values and LPI values on the "line display" menu 121 displayed on the monitor 51 through an input device such as a keyboard or a mouse provided on the personal computer system 50.

The "additional function" menu 130 is used to store or send CPI values and LPI values to the image-forming device 60 such as a printer after the CPI values and LPI values have been entered in the "setting value entry" menu 120.

Preferably, the "additional function" menu 130 is provided with a preview option 131, a setting value store option 132, and a printer transfer option 133.

The preview option 131 outputs on the monitor 51 a print file opened through the file menu 100 after a user completes the settings for each of the lines LF1 to LF10 with respect to the CPI values and LPI values entered in the "setting value entry" menu 120 by pressing the "setting value store" option 132. The user can re-set the CPI values and LPI values if the output displayed on the monitor 51 is not satisfactory.

The setting value store menu 132 stores final CPI values and LPI values set on the GUI window. Files have to be in a format that can be stored in a ROM (not shown) or a flash ROM (not shown) provided in the image-forming device 60 such as a printer. The files are typically converted into a binary file format and transferred to the image-forming device 60, but the files can be in other formats that can be stored in the ROM (not shown) or the flash ROM (not shown) of the image-forming device 60.

The printer transfer option 133 transfers the CPI values and LPI values entered in the "setting value entry" menu 120 to the image-forming device 60.

Figure 4B:
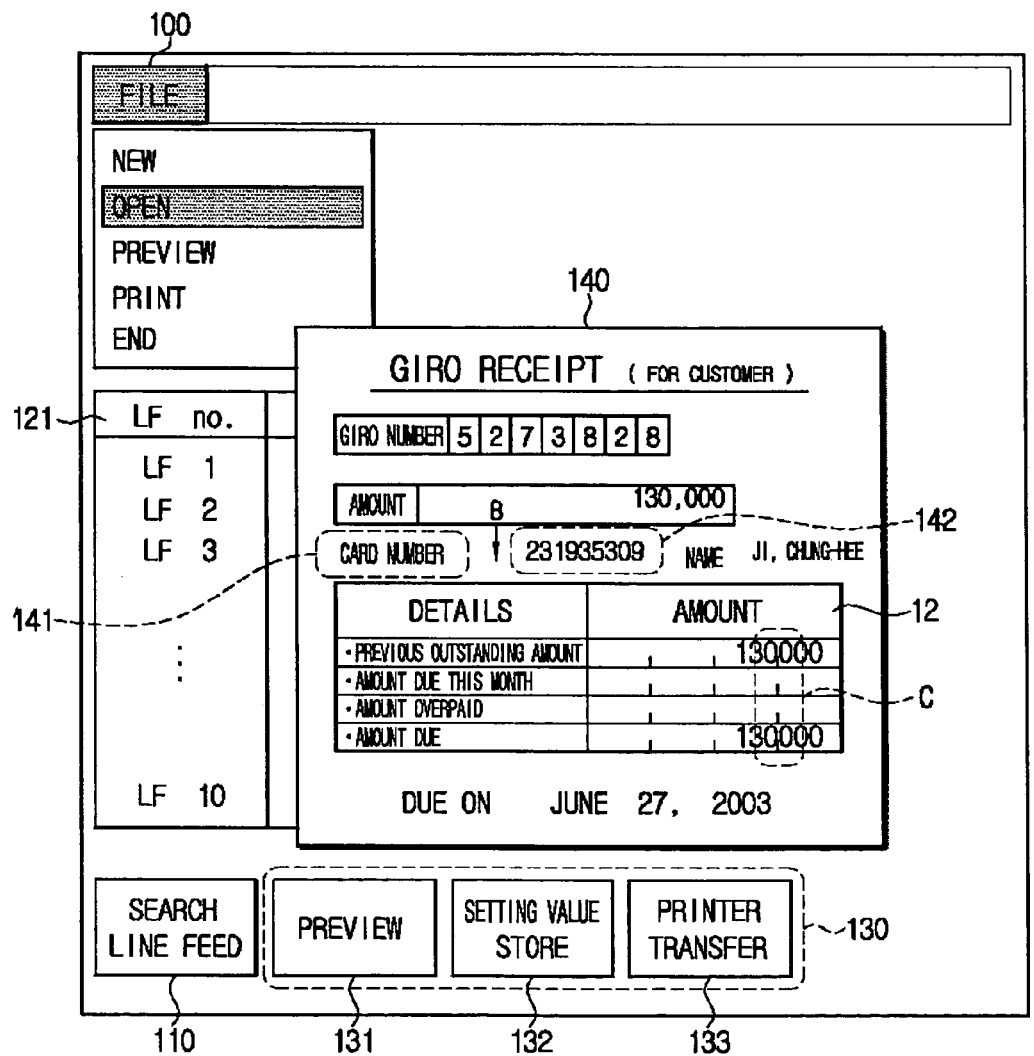
FIG. 4B is a diagram illustrating a result after a preview function is performed on the GUI window 100 shown in FIG. 4A.

FIG. 4B is a diagram illustrating a result after the preview function is performed on the GUI window 100 shown in FIG. 4A. The result is compared as follows with FIG. 1.

First, the CPI and LPI values are set page by page in FIG. 1, so that, for details for the card number 10 and the card number 11, the card number 11 in a smaller font does not look like it is on the same line and has the detail of the card number 10. The card number 11 looks like it is biased upwards or downwards compared to card number 10, but a conventional method has difficulties in performing controls for such bias line by line.

Next, the CPI and LPI values are set line by line with respect to a file selected through the GUI window 100 shown in FIG. 4B. Then, a user selects a preview option 131, and the file selected by the user is displayed in the middle of the window. As shown in FIG. 4B, it can be seen that the LPI value is set in order for the details of the card number 141 and the card number 142 printed on the displayed window 140 to be placed on the same line as much as possible. The spacing between lines is reduced by increasing the LPI value for the details of the card number 141 and the card number 142 that are located on the same line, and it can be seen that the card number 142 moves in the direction of B. Further, it can be seen that the numbers and lines are not overlapped by extending the interval between numbers with the CPI value reduced for the amount of characters printed in an area C. A user selects the preview option 131 and checks an output result of a selected file, so as to avoid unnecessary print tasks.

Figure 5A:
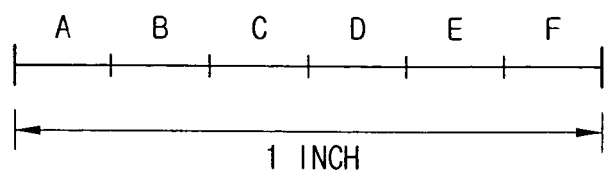
FIGS. 5A and 5B are diagrams illustrating print position changes depending upon character-per-inch (CPI) values set in the GUI window shown in FIG. 4A.
Figure 5B:
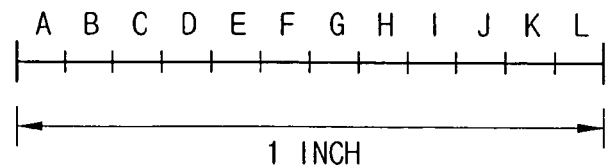

FIGS. 5A and 5B are diagrams illustrating print position changes depending upon CPI values set in the GUI window shown in FIG. 4A.

FIG. 5A is a diagram illustrating an example of a print result where a CPI value per unit length such as one inch is set to 6, and FIG. 5B is a diagram illustrating an example of a print result where a CPI value per unit length is set to 12. As shown in FIGS. 5A and 5B, the number of characters that can be printed per unit length increases as the CPI value increases, so it is possible to print a large amount of characters in a limited space of a medium having a limited size such as interim receipts.

Figure 6:
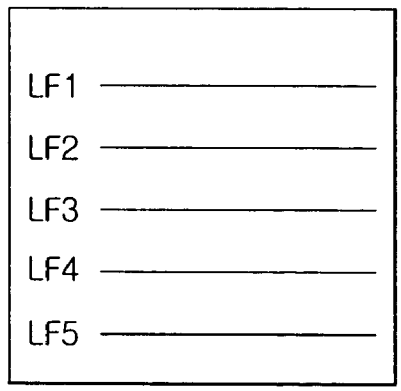
FIGS. 6A through 6C are diagrams illustrating print position changes depending upon line-per-inch (LPI) values set in the GUI window shown in FIG. 4A.
Figure 6:
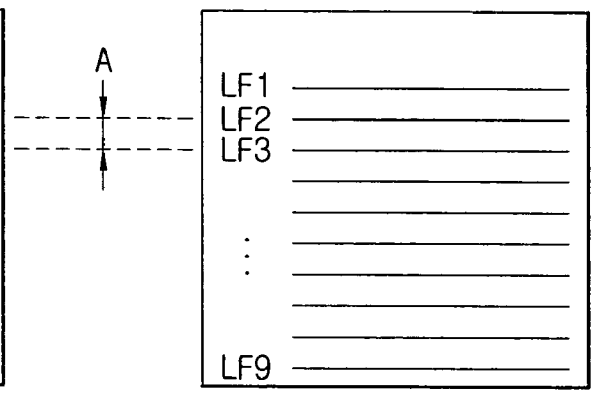
Figure 6:
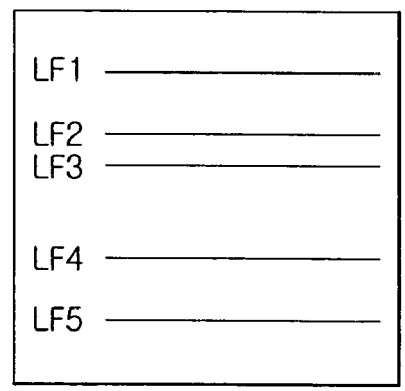

FIGS. 6A through 6C are diagrams illustrating print position changes depending upon LPI values set in the GUI window shown in FIG. 4A.

FIG. 6A is a diagram illustrating a print result in case that an LPI value per unit length such as one inch is set to 5, FIG. 6B is a diagram illustrating a print result in which an LPI value per unit length is set to 9, and FIG. 6C is a diagram illustrating a print result in which an LPI value for the third line LF3 is set to 9.

As shown in FIGS. 6A through 6C, the position of the second line shown in FIG. 6B is shifted upwards by "A" on the medium compared to the second line shown in FIG. 6A. As stated, if the LPI value increases, the print position moves upwards when a print file is printed, and, if the LPI value is decreases, the print position moves downwards. Meanwhile, FIG. 6C is a diagram illustrating a print output when the LPI value for a specific line LF3 is set to 9, which shows that only the line LF3 has moved upwards. As described, the embodiment of the present invention can be set to a user's desired positions with respect to individual lines when printing print files, and print the individual lines at the desired positions.

Figure 7:
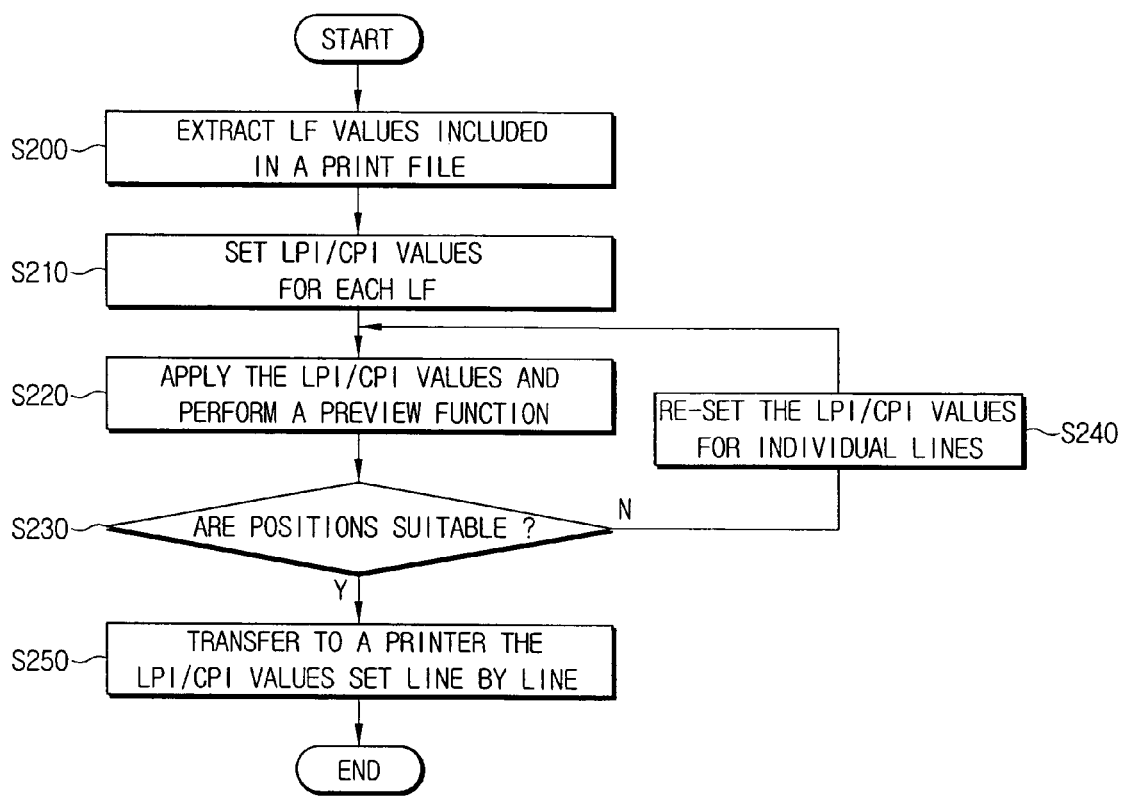
FIG. 7 is a flow chart illustrating a print option setting method for image-forming devices according to an embodiment of the present invention.

FIG. 7 is a flow chart illustrating a print option setting method for the image-forming device 60 according to an embodiment of the present invention.

First, the personal computer system 50 displays a certain GUI window on the monitor 51 for CPI and LPI value entries. The GUI window displayed on the monitor 51 is shown in FIG. 4A, and the "search line feed" menu 110 shown in FIG. 4A is selected to extract a line feed signal LF included in a print file (S200). Next, using the GUI window displayed on the monitor 51, a user enters the CPI and LPI values for the lines LF1 to LF10 corresponding to the respective extracted line feed signals LF using a keyboard and a mouse provided in the personal computer system 50 (S210). At this time, the entered CPI values have values ranging from 1 to 20, and the LPI values have values ranging from 1 to 10. A user can adjust the values according to the feature of a print file that the user wishes to print. Next, after applying the CPI and LPI values entered in the "setting value entry" menu 120 through the setting value store option 132, the user selects the preview option 131 for the print file (S220). The preview function performed when the preview option 131 is selected can be implemented by any program having a similar function such as the word processing program of Microsoft Corporation or the StarOffice program of the StarOffice Corporation, for example. The preview function provided in most word processing programs is a function of previewing a print result and widely used in most word processing programs, so a detailed description of its function will not be provided. Next, a user selects a preview option 131, checks a print image for the print file displayed on the monitor 51, and determines whether the result is suitable when the CPI and LPI values are applied (S230), and, if suitable as a result of the decision, the CPI and LPI values set line by line are sent to the image-forming device 60 such as a printer (S250). On the contrary, if the user is not satisfied with a result obtained when the CPI and LPI values are applied, the CPI and LPI values for the respective lines such as LF1 to LF10 are re-set through the "setting value entry" menu 120 (S240). Thereafter, the CPI and LPI values sent to the image-forming device 60 through the above procedure are applied in the same manner when the image-forming device 60 such as a printer prints a print file applied from the personal computer system 50.

Figure 8:
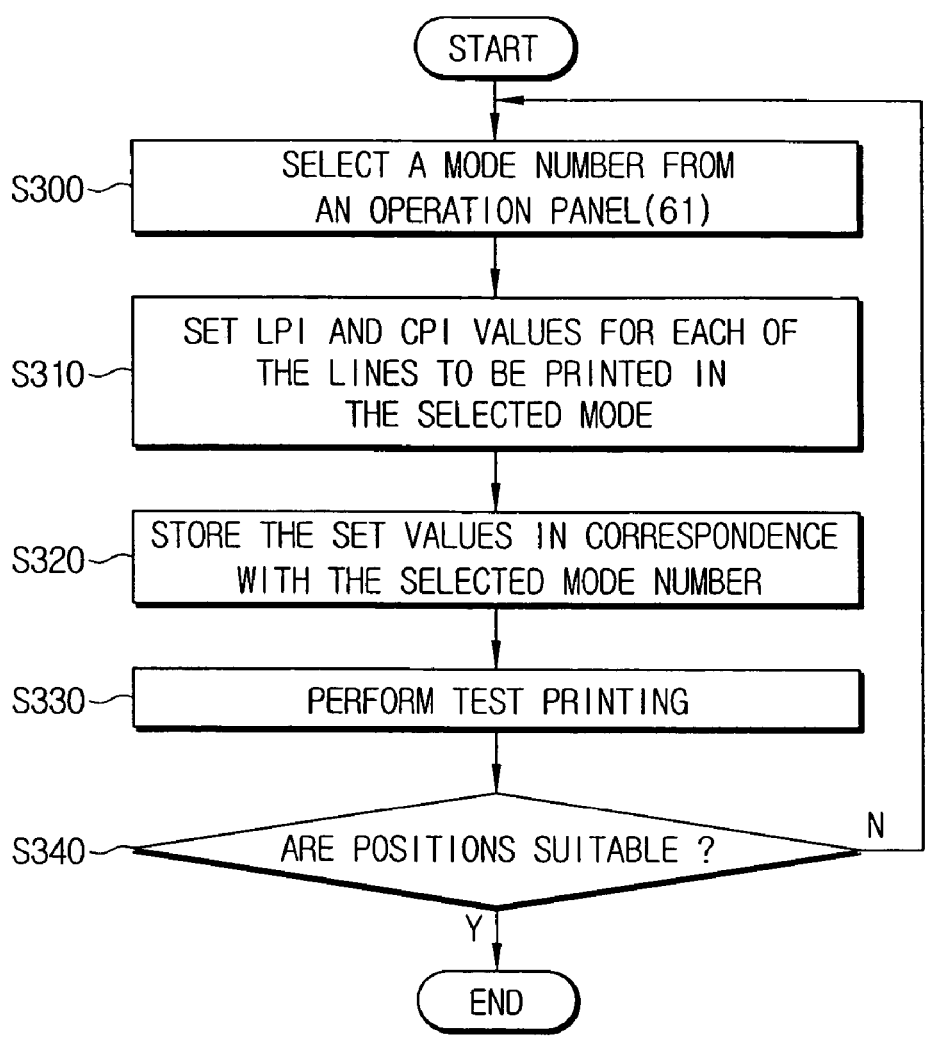
FIG. 8 is a flow chart illustrating a print option setting method for image-forming devices according to another embodiment of the present invention.

FIG. 8 is a flow chart illustrating a method for setting print options in an image-forming device according to another embodiment of the present invention.

The present embodiment shows a method for setting CPI values and LPI values using the operation panel 61 provided in the image-forming device 60 such as a printer instead of the GUI environment that the personal computer system 50 provides. The present embodiment has an advantage of eliminating an information processing device such as the personal computer system 50 when the CPI and LPI values are set.

First, a user selects a mode number through the operation panel 61 provided in the image-forming device 60 such as a printer (S300). The mode number is used for storing by unit group the set CPI and LPI values regarding individual lines provided in print data. For example, the CPI and LPI values that are necessary when bank receipts are printed can be set in the model, and CPI and LPI values necessary when interim receipts are printed can be set in mode2. That is, a user stores by unit group print option setting values with respect to different form formats, and selects and uses any of the stored modes according to the user's needs. Next, the CPI and LPI values are set for individual lines to be printed in a selected mode (S310). This function is not provided in a general printer or facsimile machine, but the function can be implemented by storing a certain program into a ROM (not shown) or a flash ROM (not shown) provided in the image-forming device 60 such as a printer. When a user selects a specific mode, the above program has functions of displaying the number of lines that can be printed, storing a number entered through the setting key 61a provided on the image-forming device regarding the displayed lines, and applying the stored number when the image-forming device such as a printer performs print tasks. Next, the user stores the CPI and LPI values set through the operation panel 61 that the user selects to be matched with a corresponding mode number (S320). Next, the user supplies a medium such as paper into the image-forming device 60 based on the stored setting values, and performs test printing (S330). Lastly, if positions of characters and lines printed on the medium are appropriate as a result of the test printing, the user stores and completes the setting values, and, otherwise, the user re-sets the LPI and CPI values through the operation panel 61, and performs the test printing. According to the print options, the user can obtain printed matter, applying CPI and LPI values depending on a specific form format that the user wishes to use.

As stated above, an embodiment of the present invention can display a print file on the GUI window through an operation panel provided on a personal computer system or an image-forming device, and easily perform print option settings depending upon diverse form formats by setting CPI and LPI values for individual lines forming each page. Accordingly, the embodiment of the present invention enables banks and corporations requiring a large number of receipts and approval forms to rapidly prepare the forms.

Although the embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A print option setting method for image-forming devices, comprising the steps of:
   detecting line feed information from a print file to be printed in the image-forming device without using a sensor;
   extracting at least one or more lines from the print file based on the line feed information;
   setting the number of characters to be printed per unit length for each of the extracted lines and the number of lines;
   sending the information on the characters set line by line and the number of lines to the image-forming device; and
   previewing on a portion of a display unit a result obtained from applying the number of characters to be printed per unit length and the number of lines that are set to the print file.

2. The print option setting method as claimed in claim 1, wherein the image-forming device stores the sent information on the number of characters to be printed per unit length and the number of lines by unit group.

3. The print option setting method as claimed in claim 2, further comprising the step of:
   setting a mode corresponding to the unit group in the image forming device.

4. The print option setting method as claimed in claim 2, further comprising the step of:
   selecting a mode out of modes set corresponding to the unit group through an operation panel provided on the image forming device.

5. The print option setting method as claimed in claim 1, wherein the image-forming device has information on the number of characters per unit length for each of the lines and the number of lines, and the information being formed by at least one or more unit groups provided in the print file.

6. The print option setting method as claimed in claim 1, wherein the number of characters to be printed per unit length for each of the extracted lines and the number of lines are set through an operation panel provided on the image forming device.

7. A system for setting a print option, comprising:
   a computer; and
   an image forming device adapted to detect line feed information without using a sensor from a print file to be printed in the image-forming device, and extract at least one or more lines from the print file based on the line feed information;

set the number of characters to be printed per unit length for each of the extracted lines and the number of lines; and send the information on the characters set line by line and the number of lines to the image-forming device from the computer, the computer including a preview function for displaying on a portion of a display unit a result obtained from applying the number of characters to be printed per unit length and the number of lines that are set to the print file.

8. The system of claim 7, wherein the image-forming device stores the sent information on the number of characters to be printed per unit length and the number of lines by unit group.

9. The system of claim 8, wherein the image forming device is further adapted to set a mode corresponding to the unit group in the image forming device.

10. The system of claim 7, wherein the image-forming device has information on the number of characters per unit length for each of the lines and the number of lines, and the information being formed by at least one or more unit groups provided in the print file.

11. The system of claim 7, wherein the image-forming device comprises a printer.

12. The system of claim 7, wherein the image forming device has an operation panel for setting the number of characters to be printed per unit length for each of the extracted lines and the number of lines.

13. A method for setting print options in an image-forming device comprising the steps of:

receiving a print file to be printed by the image forming device, the print file including a control code for each line to be printed by the image forming device, and line feed information indicating the end of a line;

detecting the line feed information in the print file without using a sensor;

extracting lines from the print file based on the line feed information;

setting the number of characters to be printed per unit length for each line extracted from the print file;

setting the number of lines per unit length to be printed for each line extracted from the print file;

sending the information on the number of characters to be printed per unit length and the number of lines to the image-forming device line by line;

storing the sent information on the characters set line by line and the number of lines in the image-forming device in a unit group; and displaying on a portion of a display unit a result obtained from applying the number of characters to be printed per unit length and the number of lines that are set to the print file.

14. The method for setting print options as claimed in claim 13, further comprising the step of:

setting a mode corresponding to the unit group in the image forming device.

* * * * *